US011455295B2

(12) United States Patent
Alroqaie

(10) Patent No.: US 11,455,295 B2
(45) Date of Patent: *Sep. 27, 2022

(54) ELECTRONIC DOCUMENT WORKFLOW

(71) Applicant: Saudi Arabian Oil Company, Dhahran (SA)

(72) Inventor: Majid Alroqaie, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 307 days.

This patent is subject to a terminal disclaimer.

(21) Appl. No.: 16/934,727

(22) Filed: Jul. 21, 2020

(65) Prior Publication Data

US 2020/0349146 A1    Nov. 5, 2020

Related U.S. Application Data

(63) Continuation of application No. 16/051,710, filed on Aug. 1, 2018, now Pat. No. 10,733,178.

(51) Int. Cl.
*G06F 16/23* (2019.01)
*G06F 16/93* (2019.01)
*H04L 9/32* (2006.01)

(52) U.S. Cl.
CPC .......... *G06F 16/2365* (2019.01); *G06F 16/93* (2019.01); *H04L 9/3247* (2013.01)

(58) Field of Classification Search
CPC ..... G06F 16/2365; G06F 16/93; H04L 9/3247
See application file for complete search history.

(56) References Cited

U.S. PATENT DOCUMENTS

| | | |
|---|---|---|
| 6,898,707 B1 | 5/2005 | Sit et al. |
| 6,931,545 B1 | 8/2005 | Ta et al. |
| 6,981,151 B1 | 12/2005 | Groeneveld et al. |
| 7,383,441 B2 | 6/2008 | Vorbruggen et al. |
| 7,398,396 B2 | 7/2008 | Arditi et al. |
| 7,487,128 B2 | 2/2009 | Spagna et al. |
| 8,477,379 B2 | 7/2013 | Viswanathan et al. |
| 8,484,723 B2 | 7/2013 | Oswalt |
| 8,656,181 B2 | 2/2014 | Balinsky et al. |

(Continued)

FOREIGN PATENT DOCUMENTS

WO    0057318 A1    9/2000

OTHER PUBLICATIONS

International Search Report and Written Opinion for International Application No. PCT/US2019/044153 (SA5913) dated Sep. 27, 2019; pp. 1-14.

(Continued)

*Primary Examiner* — Loc Tran
(74) *Attorney, Agent, or Firm* — Bracewell LLP; Constance G. Rhebergen; Brian H. Tompkins

(57) ABSTRACT

Provided are embodiments of electronic document processing that include a workflow engine executing a workflow that includes verifying material data of an electronic document, providing a verified copy of the electronic document to a reviewer for review and, in response to receiving approval of the electronic document from the reviewer, obtaining a digital signature of material data of the electronic document from the reviewer. The workflow may include a similar process for multiple reviewers, and providing the electronic document to a processor for processing.

24 Claims, 3 Drawing Sheets

(56) References Cited

U.S. PATENT DOCUMENTS

| | | | |
|---|---|---|---|
| 8,819,813 B2 | 8/2014 | Oswalt | |
| 8,949,706 B2 | 2/2015 | McCabe et al. | |
| 9,129,130 B2 | 9/2015 | Sturonas et al. | |
| 9,313,032 B2 | 4/2016 | Oswalt | |
| 9,325,508 B2 | 4/2016 | Oswalt | |
| 9,639,711 B2 | 5/2017 | Sturonas et al. | |
| 9,853,818 B2 | 12/2017 | Oswalt | |
| 2003/0217264 A1* | 11/2003 | Martin | H04L 9/3247 713/156 |
| 2011/0276875 A1* | 11/2011 | McCabe | G06F 40/174 715/255 |
| 2014/0304512 A1 | 10/2014 | Kotov et al. | |

OTHER PUBLICATIONS

Wikipedia; "Digital Signature" Available as of Apr. 5, 2018 at the website https://en.wikipedia.org/wiki/Digital_signature; pp. 1-10.

* cited by examiner

ELECTRONIC DOCUMENT WORKFLOW

RELATED APPLICATIONS

This application is a continuation of U.S. patent application Ser. No. 16/051,710, filed Aug. 1, 2018 and titled "ELECTRONIC DOCUMENT WORKFLOW", now U.S. Publication No. 2020/0042624 A1, which is hereby incorporated by reference in its entirety.

FIELD

Embodiments relate generally to electronic documents and more particularly to verifying integrity of electronic documents throughout a workflow process.

BACKGROUND

Businesses transactions are often accomplished through workflows in which documents are routed through entities for review and approval. Electronic documents are often subjected to a workflow process that includes review and approval by different entities. For example, multiple persons may be involved in generating, editing, reviewing and approving an electronic document. In the context of generating an electronic invoice document, for example, a first user may populate a "new" electronic invoice document with an amount due, a due date for payment and a destination account number, a second person may review and approve the electronic invoice document, and a third person may send the approved invoice document to a client for payment.

SUMMARY

Applicant has recognized that, although traditional document workflows can facilitate the collaboration of multiple entities to generate and approve a document for further processing, traditional workflows often suffer from various shortcomings. In some instances, there may be no assurance of the integrity of the data contained in an electronic document as it advances through a workflow. For example, the data of an electronic document may, intentionally or un-intentionally, be changed during the workflow. In some instances, there may be no assurance of the authenticity of approval of an electronic as it advances through a workflow. For example, a document may, intentionally or un-intentionally, be marked as having been reviewed by a person that did not review the document during the workflow.

Recognizing these and other shortcomings of traditional document workflows, Applicants have developed novel systems and methods for electronic document workflows. In some embodiments, an electronic document workflow includes entities digitally signing data they approve. For example, if a reviewer reviews and approves of an amount due, a due date for payment and a destination account number in an electronic invoice document during a workflow, the reviewer may digitally sign "material data" of the document, including the amount due, the due date for payment and the destination account number. The digital signature of the material data can be used in subsequent stages of the workflow to verify the integrity of material data in the electronic document and the authenticity of the approver. For example, a copy of the "approved" electronic document (including the embedded material data) and the digital signature of the material data may be stored. Upon the approved electronic document being retrieved for a next stage of the workflow, such as a second stage of review, the material data of the approved document retrieved may be identified and compared to the material data of the digital signature, to ensure that material data of the approved document retrieved is the same as the material data previously approved. Continuing with the above example, upon the electronic invoice document being needed for a next stage of the workflow, the approved electronic invoice document and the corresponding digital signature from the prior stage of the workflow may be retrieved from storage, "un-verified" material data including the amount due, the due date for payment and the destination account number, may be identified from the approved electronic invoice document retrieved, "verified material data", including the amount due, the due date for payment and the destination account number, may be identified from the digital signature, and the verified material data may be compared to the un-verified material data to determine whether they match. In response to determining that the verified material data and the un-verified material data match, the integrity of the approved electronic invoice document retrieved may be "verified" and, the approved electronic invoice document may be provided for use in the next stage of the workflow. Such a process may be repeated for each stage, such the electronic document is verified for use at each stage based on a verification of a digital signature from the preceding stage.

In some embodiments, an electronic document workflow process or associated processes are distributed across multiple entities. For example, an electronic document may be generated using an application, such as a word processing application, and be "handed-off" to a workflow engine that executes the subsequent digital signature, review and processing steps of the workflow. In some instances, the distribution of processes to different entities can improve performance of the system as a whole. For example, the application may not be burdened with the processing overhead associated with executing the digital signature, review and processing steps of the workflow and the workflow engine may not be burdened with the processing overhead associated with generating electronic documents. Moreover, the distribution of processes to different entities can improve the modularity of the system as a whole. For example, the workflow engine may be developed as a "plug-in" that can supplement an application or multiple applications. Thus, it may facilitate incorporating document workflows into "stand-alone" applications that generate electronic documents.

Although certain embodiments are described in the context of certain types of documents, such as an invoice electronic document, for the purpose of illustration, similar embodiments can be employed in various other contexts. For example, embodiments described may be employed in the context of other types of electronic documents, such as electronic contract documents.

Provided in some embodiments is a method for electronic document processing. The method including: receiving, by a workflow engine from an application, a workflow request for an electronic document including electronic document data including material data provided by an initiator user; requesting, by the workflow engine, an initiator digital signature for the electronic document, the initiator digital signature including a digital signature of the material data provided by the initiator user; receiving, by the workflow engine, the initiator digital signature; identifying, by the workflow engine, a workflow defining one or more reviewer users to review the electronic document and a processor user to conduct processing of the electronic document; the workflow engine, for each of the one or more reviewer users: obtaining the electronic document and a given digital signature of the material data of the electronic document; conducting a verification operation including: extracting un-verified material data from the electronic document; extracting verified material data from the given digital signature; and comparing the un-verified material data to the verified material data to determine that the un-verified material data and the verified material data match; in response to determining that the un-verified material data and the verified material data match, providing the electronic document for review by the reviewer user; receiving an approval notice including an indication of approval of the electronic document by the reviewer user; in response to receiving the approval notice, requesting a reviewer digital signature for the electronic document, the reviewer digital signature including a digital signature of the material data provided by the reviewer user; receiving the reviewer digital signature; and in response to receiving the reviewer digital signature, determining that the reviewer user has approved the electronic document; determining, by the workflow engine, that all of the one or more reviewer users have approved the electronic document; and in response to the workflow engine determining that all of the one or more reviewer users have approved the electronic document, the workflow engine providing the electronic workflow document for processing by the processor user.

In some embodiments, the method includes: receiving, by the application from an initiator user, the electronic document data including the material data; generating, by the application using the electronic document data including the material data, the electronic document; and storing, by the application, the electronic document in data storage. In certain embodiments, the workflow engine providing the electronic workflow document for processing by the processor user includes the workflow engine: obtaining the electronic document and a final digital signature of the material data of the electronic document; conducting a verification operation including: extracting final un-verified material data from the electronic document; extracting final verified material data from the final digital signature; and comparing the final un-verified material data to the final verified material data to determine that the final un-verified material data and the final verified material data match; in response to determining that the final un-verified material data and the final verified material data match, providing the electronic workflow document for processing by the processor user. In some embodiments, the document data includes the material data and general data. In certain embodiments, the workflow engine obtaining the electronic document includes the workflow engine obtaining the electronic document from the application. In some embodiments, the given digital signature of the material data of the electronic document is generated by a user using a smart card associated with the user. In certain embodiments, operations performed by the application are performed by a first processor device and operations performed by the workflow engine are performed by a second processor device that is different from the first processor device. In some embodiments, the application includes a word processing application.

Provided in some embodiments is a non-transitory computer readable storage medium including program instructions stored thereon that are executable by a processor to cause the following operations: receiving, by a workflow engine from an application, a workflow request for an electronic document including electronic document data including material data provided by an initiator user; requesting, by the workflow engine, an initiator digital signature for the electronic document, the initiator digital signature including a digital signature of the material data provided by the initiator user; receiving, by the workflow engine, the initiator digital signature; identifying, by the workflow engine, a workflow defining one or more reviewer users to review the electronic document and a processor user to conduct processing of the electronic document; the workflow engine, for each of the one or more reviewer users: obtaining the electronic document and a given digital signature of the material data of the electronic document; conducting a verification operation including: extracting un-verified material data from the electronic document; extracting verified material data from the given digital signature; and comparing the un-verified material data to the verified material data to determine that the un-verified material data and the verified material data match; in response to determining that the un-verified material data and the verified material data match, providing the electronic document for review by the reviewer user; receiving an approval notice including an indication of approval of the electronic document by the reviewer user; in response to receiving the approval notice, requesting a reviewer digital signature for the electronic document, the reviewer digital signature including a digital signature of the material data provided by the reviewer user; receiving the reviewer digital signature; and in response to receiving the reviewer digital signature, determining that the reviewer user has approved the electronic document; determining, by the workflow engine, that all of the one or more reviewer users have approved the electronic document; and in response to the workflow engine determining that all of the one or more reviewer users have approved the electronic document, the workflow engine providing the electronic workflow document for processing by the processor user.

In some embodiments, the operations further include: receiving, by the application from the initiator user, the electronic document data including the material data; generating, by the application using the electronic document data including the material data, the electronic document; and storing, by the application, the electronic document in data storage. In certain embodiments, the workflow engine providing the electronic workflow document for processing by the processor user includes the workflow engine: obtaining the electronic document and a final digital signature of the material data of the electronic document; conducting a verification operation including: extracting final un-verified material data from the electronic document; extracting final verified material data from the final digital signature; and comparing the final un-verified material data to the final verified material data to determine that the final un-verified material data and the final verified material data match; in response to determining that the final un-verified material data and the final verified material data match, providing the electronic workflow document for processing by the processor user. In some embodiments, the document data includes the material data and general data. In certain embodiments, the workflow engine obtaining the electronic document includes the workflow engine obtaining the electronic document from the application. In some embodiments, the given digital signature of the material data of the electronic document is generated by a user using a smart card associated with the user. In certain embodiments, operations performed by the application are performed by a first processor device and operations performed by the workflow engine are performed by a second processor device that is different from the first processor device. In some embodiments, the application includes a word processing application.

Provided in some embodiments is a system for electronic document processing. The system including: a workflow engine adapted to: receive, from an application, a workflow request for an electronic document including electronic document data including material data provided by an initiator user; request an initiator digital signature for the electronic document, the initiator digital signature including a digital signature of the material data provided by the initiator user; receive the initiator digital signature; identify a workflow defining one or more reviewer users to review the electronic document and a processor user to conduct processing of the electronic document; for each of the one or more reviewer users: obtain the electronic document and a given digital signature of the material data of the electronic document; conduct a verification operation including: extracting un-verified material data from the electronic document; extracting verified material data from the given digital signature; and comparing the un-verified material data to the verified material data to determine that the un-verified material data and the verified material data match; in response to determining that the un-verified material data and the verified material data match, provide the electronic document for review by the reviewer user; receive an approval notice including an indication of approval of the electronic document by the reviewer user; in response to receiving the approval notice, request a reviewer digital signature for the electronic document, the reviewer digital signature including a digital signature of the material data provided by the reviewer user; receive the reviewer digital signature; and in response to receiving the reviewer digital signature, determine that the reviewer user has approved the electronic document; determine that all of the one or more reviewer users have approved the electronic document; and in response to the workflow engine determining that all of the one or more reviewer users have approved the electronic document, provide the electronic workflow document for processing by the processor user.

In some embodiments, the system further including an application adapted to: receive, from the initiator user, the electronic document data including the material data; generate, using the electronic document data including the material data, the electronic document; and store the electronic document in data storage. In certain embodiments, providing the electronic workflow document for processing by the processor user includes: obtain the electronic document and a final digital signature of the material data of the electronic document; conduct a verification operation including: extracting final un-verified material data from the electronic document; extracting final verified material data from the final digital signature; and comparing the final un-verified material data to the final verified material data to determine that the final un-verified material data and the final verified material data match; in response to determining that the final un-verified material data and the final verified material data match, provide the electronic workflow document for processing by the processor user. In some embodiments, the document data includes the material data and general data. In certain embodiments, obtaining the electronic document includes the obtaining the electronic document from the application. In some embodiments, the given digital signature of the material data of the electronic document is generated by a user using a smart card associated with the user. In certain embodiments, operations performed by the application are performed by a first processor device and operations performed by the workflow engine are performed by a second processor device that is different from the first processor device. In some embodiments, the application includes a word processing application.

Figure 1:
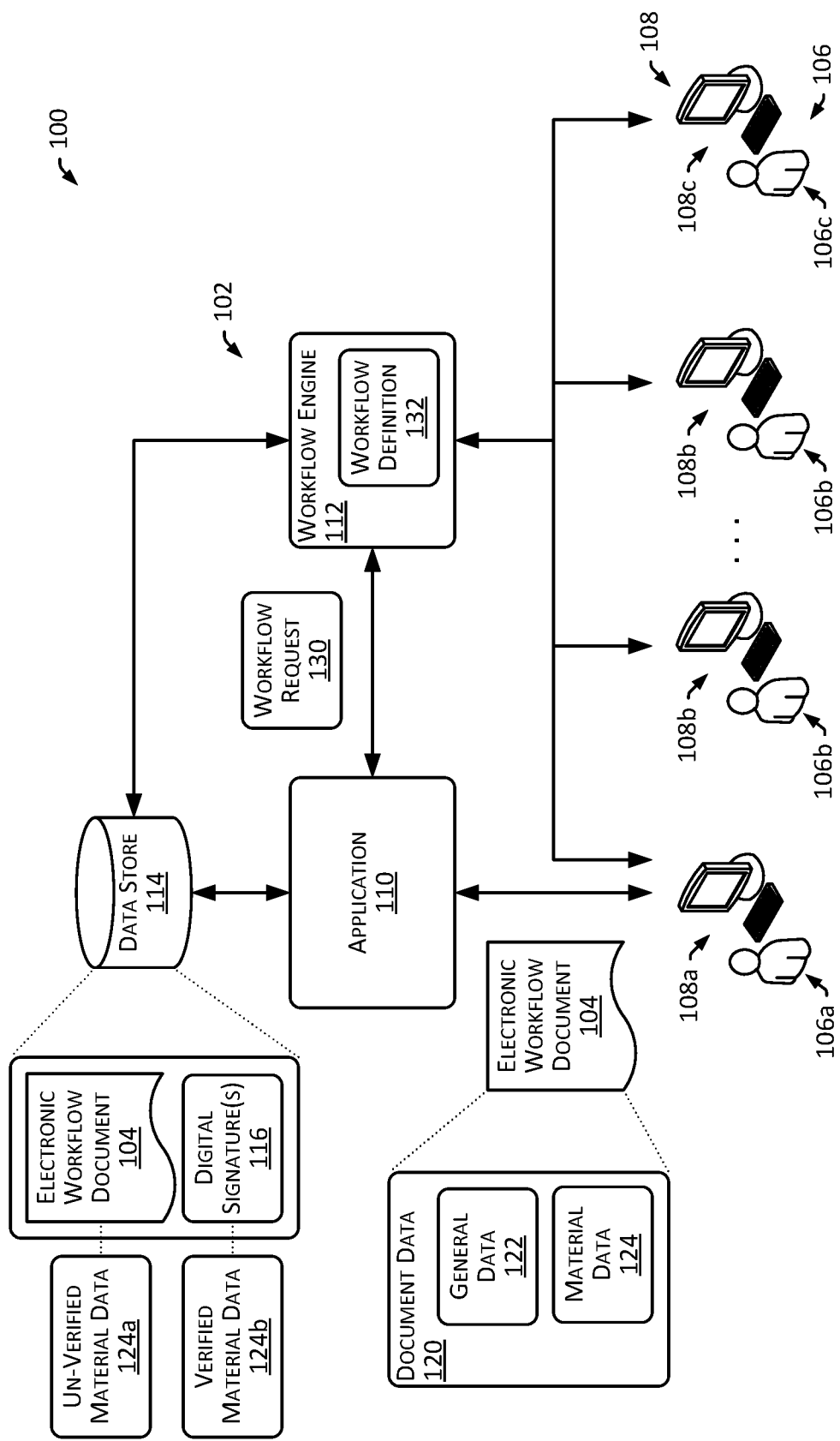
FIG. 1 is a diagram that illustrates an electronic document workflow environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments of systems and methods for electronic document workflows. In some embodiments, an electronic document workflow includes entities digitally signing data they approve. For example, if a reviewer reviews and approves of an amount due, a due date for payment and a destination account number in an electronic invoice document during a workflow, the reviewer may digitally sign "material data" of the document, including the amount due, the due date for payment and the destination account number. The digital signature of the material data can be used in subsequent stages of the workflow to verify the integrity of material data in the electronic document and the authenticity of the approver. For example, a copy of the "approved" electronic document (including the embedded material data) and the digital signature of the material data may be stored. Upon the approved electronic document being retrieved for a next stage of the workflow, such as a second stage of review, the material data of the approved document retrieved may be identified and compared to the material data of the digital signature, to ensure that material data of the approved document retrieved is the same as the material data previously approved. Continuing with the above example, upon the electronic invoice document being needed for a next stage of the workflow, the approved electronic invoice document and the corresponding digital signature from the prior stage of the workflow may be retrieved from storage, "un-verified" material data including the amount due, the due date for payment and the destination account number, may be identified from the approved electronic invoice document retrieved, "verified material data", including the amount due, the due date for payment and the destination account number, may be identified from the digital signature, and the verified material data may be compared to the un-verified material data to determine whether they match. In response to determining that the verified material data and the un-verified material data match, the integrity of the approved electronic invoice document retrieved may be "verified" and, the approved electronic invoice document may be provided for use in the next stage of the workflow. Such a process may be repeated for each stage, such the electronic document is verified for use at each stage based on a verification of a digital signature from the preceding stage.

In some embodiments, an electronic document workflow process or associated processes are distributed across multiple entities. For example, an electronic document may be generated using an application, such as a word processing application, and be "handed-off" to a workflow engine that executes the subsequent digital signature, review and processing steps of the workflow. In some instances, the distribution of processes to different entities can improve performance of the system as a whole. For example, the application may not be burdened with the processing overhead associated with executing the digital signature, review and processing steps of the workflow and the workflow engine may not be burdened with the processing overhead associated with generating electronic documents. Moreover, the distribution of processes to different entities can improve the modularity of the system as a whole. For example, the workflow engine may be developed as a "plug-in" that can supplement an application or multiple applications. Thus, it may facilitate incorporating document workflows into "stand-alone" applications that generate electronic documents.

Although certain embodiments are described in the context of certain types of documents, such as an invoice electronic document, for the purpose of illustration, similar embodiments can be employed in various other contexts. For example, embodiments described may be employed in the context of other types of electronic documents, such as electronic contract documents.

FIG. 1 is a diagram that illustrates an electronic document workflow environment 100 in accordance with one or more embodiments. In the illustrated embodiment, the electronic document workflow environment 100 includes a workflow system 102 for executing an electronic document workflow for an electronic workflow document 104. In some embodiments, a given user 106 (e.g., an initiating user (or "initiator") 106a) may be tasked with initiating a workflow for the electronic workflow document 104 (e.g., an invoice), one or more other users 106 (e.g., reviewing users (or "reviewers") 106b) may be tasked with reviewing and approving the electronic workflow document 104, and a user 106 (e.g., a processing user (or "processor") 106c) may be tasked with taking action on an "approved" version of the electronic workflow document 104 (e.g., sending the approved invoice to a client for payment). In some embodiments, each of the users 106 include person or other entities tasked with completing particular aspects of the workflow process. For example, the initiator 106a may include an assistant tasked with generating an invoice, the first reviewer 106b may include a sales person that is tasked with verifying the invoice before it is sent to a sales manager for approval, the second reviewer 106b may include the sales manager which is tasked with verifying the invoice before it is sent to the client, and the processor 106c may include an accountant that is tasked with sending the invoice to the client.

In some embodiments the workflow system 102 includes user devices 108 (e.g., user devices 108a-108c), an application 110, a workflow engine 112, and data store 114. In some embodiments, the application 110 or the workflow engine 112 include or are executed on a computer device that is the same or similar to that of the computer system 1000 described with regard to at least FIG. 3. In some embodiments, the user devices 108 include computer device that are the same or similar to that of the computer system 1000 described with regard to at least FIG. 3.

In some embodiments, the user devices 108 include computer devices that can be employed by respective users 106 to execute various stages of the workflow for the electronic workflow document 104. For example, each of the user devices 108a-108c may be a computer (e.g., a desktop computer, or a mobile computer device, such as a tablet or smart phone) used by a respective one of the users 106a-106c to execute the respective stage of the electronic document workflow that user 106 is responsible for. For example, the initiator 106a may initiate the workflow for the electronic workflow document 104 using the user device 108a (e.g., including entering invoice document data for populating the invoice), the one or more reviewers 106b may conduct a review/approval of the electronic workflow document 104 using respective user devices 108b (e.g., including first and second reviewers 106b each reviewing/approving the invoice using their respective user devices 108b), and the processor 106b may process the electronic workflow document 104 using the user device 108c (e.g., including sending the "approved" invoice to a client to request payment of amounts due).

In some embodiments, the application 110 includes a software application that can be employed generate, edit or review electronic documents. For example, the application 110 may include a word processing program (e.g., Microsoft Word) or other digital document application (e.g., Adobe Acrobat) that can be used to generate, review or edit electronic documents (e.g., Microsoft Word documents or portable document format (PDF) documents). In some embodiments, the application 110 is stored on or otherwise accessible to one or more of the user devices 108. For example, the application 110 may include a "local" digital document application that is installed on a user device 108, and is executed by a processor of the user device 108. As a further example, the application 110 may include a "remote" or "cloud" based digital document application having a local client that is installed on or that otherwise executes on the user device 108 and that communicates (e.g., over a network connection) with a remote server that executes some or all of the software routines of the application 110.

In some embodiments, the workflow engine 112 includes a software application that is employed to manage workflow processes for electronic documents. For example, the workflow engine 112 may include an application that receives, from the user device 108a, a request to initiate a workflow for the electronic workflow document 104 (a "workflow request") and that, in response to the request, coordinates review/approval of the electronic workflow document 104 by one or more reviewers 108b and processing of the approved electronic workflow document 104 by the processor 106c. In some embodiments, the workflow engine 112 is separate from the application 110. For example, the application 110 may include a first software module (e.g., residing on the initiating device 108), and the workflow engine 112 may include a second software module (e.g., residing on a network server). In such an arrangement, the application 110 and the workflow engine 112 may conduct electronic document workflow tasks in parallel or independent of one another. For example, the application 110 may execute tasks for initiating a workflow process for the electronic workflow document 104 (e.g., including generating and storing an initial version of the electronic workflow document 104 and submitting a workflow request for an electronic workflow document 104 to the workflow engine 112), and the workflow engine 112 may execute tasks for completing the workflow process for the electronic workflow document 104 (e.g., including a review/approval portion of the workflow that includes coordinating review and approval of the electronic workflow document 104 by one or more reviewers 106*b*), and a processing portion of the workflow that includes providing the electronic workflow document 104 to the processor 106*c* for subsequent processing). Thus, the application 110 may complete the initiation portion of the workflow and "hand-off" the workflow document to the workflow engine 112 for completion of the review/approval portion of the workflow and the processing portion of the workflow. Such a distribution of tasks may help to distribute the processing overhead. For example, the hand-off of the completion of the workflow process may reduce processing overhead of the application 110, which can help to improve performance of the application 110. Moreover, the distribution of tasks may provide modularity that enables the workflow engine 112 to complete similar tasks for various applications. For example, the workflow engine 112 may be developed as a "plug-in" module that can coordinate workflows for the application 110 and other applications.

In some embodiments, the data store 114 incudes a database. For example, the data store 114 may include a database that is accessible by the application 110 or the workflow engine 112. In some embodiments, the electronic workflow document 104 or digital signatures 116 corresponding to the electronic workflow document 104 may be stored in the data store 114. For example, during the workflow process for the electronic workflow document 104 the document and digital signatures 116 for "material data" in the electronic workflow document 104 digitally signed by one or more of the users 106 may be stored in the data store 114. This material data and digital signatures 116 may be used for, example, to verify integrity of the electronic workflow document 104 and the authenticity of approvals of the electronic workflow document 104 at various stages of the workflow.

The electronic workflow document 104 maybe populated with document data 120. The document data 120 may include general data 122 and material data 124. General data 122 may include data that is of relevantly low importance. Material data 124 may include data that is of relatively high importance. For example, in the context of an invoice, the general data 122 may include a "stock" paragraph explaining that the invoice is being issued for good or services rendered, and the material data 124 may include "variable" data outlining critical aspects of the invoice, such as an amount due, a due date for payment and a destination account number, that warrant review/approval.

In some embodiments, digital signatures are generated using public key cryptography. For example, a private key and a public key pair may be generated. The private key may be a secret key that is associated with a user, and that can be used by the user to encrypt (or "digitally sign") data. The public key may be a key that can be provided to one or more parties for use in decrypting data encrypted (or "digitally signed") using the public key. Thus, data may be encrypted (or "digitally signed") using a private key of a party signing the data, and the resulting encrypted (or "digitally signed") data may be decrypted using the corresponding public key that is associated with the private key, to extract (or "recover") the data. For example, a user 106 may be assigned a private key and an associated public key may be provided to the workflow engine 112. The user may encrypt (or "digitally sign") material data 124 of an electronic workflow document 104 using the private key assigned to the user 106. The resulting encrypted data may be the user's digital signature 116 of the material data 124. The workflow engine 112 may receive the digital signature and decrypt the digital signature 116 of the material data 124 using the corresponding public key to extract (or "recover") the material data 124 from the digital signature 116. If the digital signature 116 cannot be decrypted using the corresponding public key, it may indicate that the digital signature 116 was not generated using the corresponding private key and thus may not be authentic to the user 106.

In some embodiments, digital signatures are generated using a "local" private key. For example, a user 106 may digitally sign material data 124 using a private key stored on her/his device 108. In some embodiments, digital signatures are generated using a "smart card" private key. For example, a user 106 may digitally sign material data 124 using a private key stored on a smart card (e.g., a card or chip that stores the private key). To digitally sign the material data 124, the user 106 may insert the smart card into her/his device 108, and device 108 may access the private key stored on the smart card (e.g., responsive to the user 106 entering a personal identification number (PIN) or password) and digitally sign the material data 124 using the private key to generate a corresponding digital signature 116 of the material data 124.

In some embodiments, material data 124 extracted from an electronic workflow document 104 may be referred to as "un-verified" material data 124*a*, and material data 124 extracted from a digital signature 116 may be referred to as "verified" material data 124*b*. As described "un-verified" material data 124*a* and "verified" material data 124*b* may be compared to verify the integrity of material data 124 of an electronic workflow document 104.

In some embodiments, a workflow request 130 for the electronic workflow document 104 is submitted to the workflow engine 112, to initiate review/approval and processing portions of a workflow for the electronic workflow document. In some embodiments, the workflow request 130 specifies procedural details of the workflow process. For example, the workflow request 130 may include a workflow definition 132 that defines the one or more reviewers 106*b* (e.g., Jane and John), the processor 106*c* (e.g., Carol), the order of review (e.g., review/approval by Jane then John, in sequence), or the material data 124 (e.g., an amount due, a due date for payment and a destination account number) for the workflow for the electronic workflow document 104. The workflow engine 112 may store the workflow definition 132 in association with the electronic workflow document 104. In some embodiments, the workflow definition 132 may be predefined. The workflow engine 112 may store a predefined workflow definition for certain types of workflow documents, and associate the predefined workflow definition with electronic workflow documents received that are of that type. For example, the workflow engine 112 may store a predefined workflow definition 132 for invoice documents received from the given initiator 106*a* (e.g., Mike) that includes sequential review by a given first reviewer 106*b* (e.g., Jane) and given second reviewer 106*b* (e.g., John), and processing by a processor 106*c* (e.g., Carol).

In some embodiments, the workflow system 102 is employed to execute an electronic document workflow for an electronic workflow document. The workflow may include a workflow initiation portion (see, e.g., section "A" of FIG. 2, including stages for the initiator 106*a* generating an electronic workflow document 104 and initiating a workflow for the electronic workflow document 104), a review/approval portion (see, e.g., section "B" of FIG. 2 including stages of coordinated review and approval of the electronic workflow document 104 by one or more reviewers 106*b*) and a processing portion (see, e.g., section "C" of FIG. 2, including stages for facilitating use of the electronic workflow document 104 by the processor 106*c*).

Figure 2:
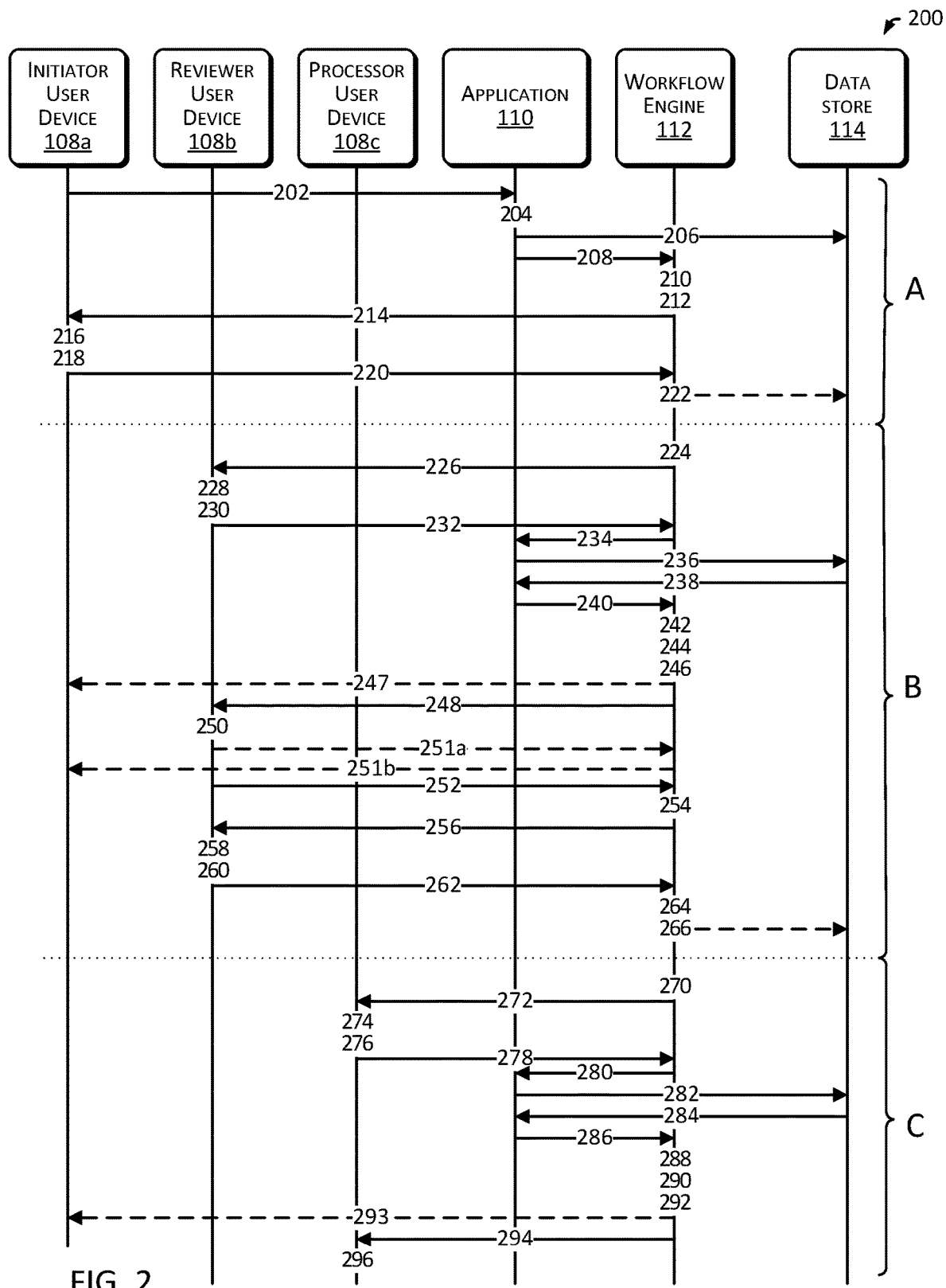
FIG. 2 is a dataflow diagram that illustrates a method of executing an electronic document workflow in accordance with one or more embodiments.

FIG. 2 is a dataflow diagram that illustrates a method of executing a workflow for an electronic workflow document 200 in accordance with one or more embodiments. In some embodiments, an electronic workflow document 104 is generated or otherwise populated using the application 110. For example, the initiator 106*a* (e.g., Mike) may submit, by way of the "initiator" user device 108*a*, document data 120 (e.g., invoice data) to the application 110 (element 202), and the application 110 may, in turn, assemble the electronic workflow document 104, including populating the electronic workflow document 104 (e.g., an invoice) with the document data 120 (element 204). The document data 120 may include general data 122 and material data 124. General data 122 may include data that is of relevantly low importance. Material data 124 may include data that is of relatively high importance. For example, in the context of an invoice, the general data 122 may include a "stock" paragraph explaining that the invoice is being issued for good or services rendered, and the material data 124 may include "variable" data outlining critical aspects of the invoice, such as an amount due, a due date for payment and a destination account number, that warrant review/approval.

In some embodiments, the electronic workflow document 104 is stored and a corresponding workflow process is undertaken by the workflow engine 112. For example, in response to the initiator 106*a* (e.g., Mike) submitting the document data 120 including the general data 122 and material data 124, and indicating completion of the electronic workflow document 104 (e.g., Mike selecting an option in the application 110 to initiate the approval/review of the electronic workflow document 104), the application 110 may assemble the electronic workflow document 104 using the document data 120 (element 204), store the electronic workflow document 104 in the data store 114 (element 206), and send, to the workflow engine 112, a workflow request 130 for the electronic workflow document 104 (e.g., including a request to conduct an approval/review process for the electronic workflow document 104) (element 208). In some embodiments, the workflow request 130 specifies procedural details of the workflow process. For example, the workflow request 130 may include a workflow definition 132 that defines the one or more reviewers 106*b* (e.g., Jane and John), the processor 106*c* (e.g., Carol), the order of review (e.g., review/approval by Jane then John, in sequence), or the material data 124 (e.g., an amount due, a due date for payment and a destination account number) for the workflow for the electronic workflow document 104. The workflow engine 112 may store the workflow definition 132 in association with the electronic workflow document 104. In some embodiments, the workflow definition 132 may be predefined. The workflow engine 112 may store a predefined workflow definition for certain types of workflow documents, and associate the predefined workflow definition with workflow documents received that are of that type. For example, the workflow engine 112 may store a predefined workflow definition 132 for invoice documents received from the given initiator 106*a* (e.g., Mike) that includes sequential review by a given first reviewer 106*b* (e.g., Jane) and given second reviewer 106*b* (e.g., John), and processing by a processor 106*c* (e.g., Carol).

The workflow engine 112 may, in response to receiving the electronic workflow document 104, define a workflow for the electronic workflow document 104 based on the workflow definition 132 associated with the workflow document (e.g., define a workflow that includes sequential review by Jane and John, and processing by Carol) (element 210), identify the material data 124 of the electronic workflow document 104 based on the workflow definition 132 associated with the workflow document (e.g., identify the amount due, the due date for payment and the destination account number specified in the invoice) (element 212), and send, to the initiator device 108*a* associated with the initiator 106*a*, a "signature request" that request that the initiator 106*a* digitally sign the material data 124 (e.g., send, to Mike's device, a request for Mike to digitally sign the amount due, the due date for payment and the destination account number specified in the invoice) (element 214).

The initiator device 108*a* may, in response to receiving the signature request, query the initiator 106*a* to digitally sign the material data 124 (e.g., Mike's device may query Mike to digitally sign the amount due, the due date for payment and the destination account number specified in the invoice) (element 216). The initiator 106*a* may digitally sign the material data 124 to generate an "initiator" digital signature 116 (e.g., Mike may digitally sign the amount due, the due date for payment and the destination account number specified in the invoice using Mike's smart card physically present at Mike's device) (element 218). The initiator device 108*a* may, in response to generation or receipt of the initiator digital signature 116, send the initiator digital signature 116 to the workflow engine 112 (element 220).

The workflow engine 112 may, in response to receiving the initiator digital signature 116, store the initiator digital signature 116 (e.g., store Mike's digital signature of the material data in a local memory of the workflow engine 212, in the data store 114 or in other memory) (element 222). The workflow engine 212 may identify the first reviewer 106*b* of the workflow defined for the electronic workflow document 104 based on the defined workflow (e.g., identify Jane as the first reviewer of the invoice) (element 224) and send a "review request" to the "reviewer" device 108*b* associated with the first reviewer 106*b* (e.g., send a review request to Jane's device) (element 226). The review request may include, for example, an e-mail message alerting the first reviewer 106*b* (e.g., Jane) that an electronic workflow document 104 (e.g., the invoice) is awaiting her/his review and approval, and including an interactive link that is user selectable to initiate her/his review of the electronic workflow document 104.

The reviewer device 108*b* may, in response to receiving the review request, present the review request to the first reviewer 106*b* (e.g., Jane's device may display the e-mail message for Jane's review) (element 228). The first reviewer 106*b* may provide, to the first reviewer device 108*b*, an indication that she/he is ready to proceed with the requested review of the electronic workflow document 104 (e.g., Jane may select the interactive link presented in the e-mail message to initiate her review of the invoice) (element 230). The first reviewer device 108*b* may, in response to receiving the indication that the first reviewer 106*b* is ready to proceed with the requested review of the electronic workflow document 104, send to the workflow engine 212 a "review initiation request" including an indication that the first reviewer 106*b* is ready to proceed with the requested review of the electronic workflow document 104 (e.g., Jane's device may, in response to Jane selecting the interactive link presented in the e-mail message, send a corresponding review initiation request to the workflow engine 212) (element 232).

The workflow engine 212 may, in response to receiving the review initiation request, send, to the application 110, a "document request" including a request for the currently stored version of the electronic workflow document 104 (e.g., including a request for the currently stored version of the invoice) (element 234). The application 110 may, in response to receiving the document request, query the data store 114 for the for the currently stored version of the electronic workflow document 104 (element 236). The data store 114 may, in response to receiving the query, send, to the application 110, a copy of the currently stored version of the electronic workflow document 104 (e.g., send, to the application 110, a copy of the currently stored version of the invoice that was generated by Mike) (element 238). The application 110 may, in response to receiving the copy of the currently stored version of the electronic workflow document 104, send, to the workflow engine 212, the copy of the currently stored version of the electronic workflow document 104 (e.g., send, to the workflow engine 212, a copy of the currently stored version of the invoice that was generated by Mike) (element 240).

The workflow engine 212 may, in response to receiving the copy of currently stored version of the electronic workflow document 104, conduct a "verification" operation that includes the following: extracting "un-verified" material data 124a from the copy of the currently stored version of the electronic workflow document 104 (e.g., identify the amount due, the due date for payment and the destination account number specified in the copy of the currently stored version of the invoice) (element 242), extracting "verified" material data 124b of the "current" digital signature 116 for the electronic workflow document 104 (e.g., identify the amount due, the due date for payment and the destination account number specified in the initiator digital signature for the copy of the currently stored version of the invoice) (element 244), and comparing the "un-verified" material data 124a to the "verified" material data 124b to determine whether or not they match (element 246). Such a verification process may in effect, allow the workflow engine 112 to determine whether the material data 124 of the currently stored version of the electronic workflow document 104 matches that of the electronic workflow document 104 generated by the initiator 106a (e.g., indicating that the material data 124 has not been altered), or does not match (e.g., indicating that the material data 124 has been altered). For example, by this comparison, the workflow engine 112 may determine whether the amount due, the due date for payment and the destination account number of the current/retrieved version of the invoice matches the amount due, the due date for payment and the destination account number entered in the invoice generated by Mike and, thus, is un-altered relative to the material data entered by Mike, or does not match and, thus, has been altered relative to the material data entered by Mike.

The workflow engine 212 may, in response to determining that the "un-verified" material data 124a and the "verified" material data 124b do not match, determine that the copy of the electronic workflow document 104 cannot be verified and send a corresponding notice to the relevant parties, including the initiator 106a or any other parties that have already reviewed/approved the electronic workflow document 104 (e.g., send, to Mike, a notice that the currently stored version of the invoice cannot be verified) (element 247). This may alert the parties to the fact that the electronic workflow document 104 has been altered or otherwise not approved. The initiator 106a can, then, identify any errors and reinitiate a workflow process for the electronic workflow document 104, if desired.

The workflow engine 212 may, in response to determining that the "un-verified" material data 124a and the "verified" material data 124b match, send, to the first reviewer device 108b, the copy of the currently stored version of the electronic workflow document 104 (e.g., send the copy of the current version of the invoice to Jane's device) (element 248).

The first reviewer device 108b may, in response to receiving the copy of the currently stored version of the electronic workflow document 104, display the copy of the currently stored version of the electronic workflow document 104 for review by the first reviewer 106b along with an option to approve, edit or disapprove (or "reject") the electronic workflow document 104 (e.g., Jane's device may display the copy of the currently stored version of the invoice for review by Jane, along with an option for Jane to approve, edit or disapprove the displayed invoice) (element 250).

The first reviewer device 108b may, in response to receiving an indication that the first reviewer 106b has edited or disapproves of the electronic workflow document 104, send, to the workflow engine 212, a corresponding "edit notice" or "disapproval notice" including a respective indication that the first reviewer 106b has edited or disapproves of the electronic workflow document 104 (element 251a). The workflow engine 212 may, in response to receiving the edit notice or the disapproval notice send, a corresponding notice to the relevant parties, including the initiator 106a or any other parties that have already reviewed/approved the electronic workflow document 104 (e.g., send, to Mike, a notice that the currently stored version has been edited or disapproved by Jane) (element 251b). This may alert the initiator 106a (e.g., Mike) that the electronic workflow document 104 has not been approved. The initiator 106a can, then, identify any errors and reinitiate a workflow process for the electronic workflow document 104, if desired.

The first reviewer device 108b may, in response to receiving an indication that the first reviewer 106b approves of the electronic workflow document 104, send, to the workflow engine 212, an "approval notice" including an indication that the first reviewer 106b approves of the electronic workflow document 104 (e.g., Jane's device may send, to the workflow engine 212, an approval notice indicating that Jane approves of the current version of the invoice) (element 252).

The workflow engine 212 may, in response to receiving the approval, identify the material data 124 of the electronic workflow document 104 (e.g., identify the amount due, the due date for payment and the destination account number specified in the invoice) (element 254), and send, to the first reviewer device 108b, a request to digitally sign the material data 124 (e.g., send, to Jane's device, a request for Jane to digitally sign the amount due, the due date for payment and the destination account number specified in the invoice she approved) (element 256).

The first reviewer device 108b may, in response to receiving the request to digitally sign the material data 124, query the first reviewer 106b to digitally sign the material data 124 (e.g., Jane's device may query Jane to digitally sign the amount due, the due date for payment and the destination account number specified in the invoice she approved) (element 258). The first reviewer 106b may digitally sign the material data 124 to generate a "first reviewer" digital signature 116 (e.g., Jane may digitally sign the amount due, the due date for payment and the destination account number specified in the invoice using Jane's smart card physically present at Jane's reviewer device) (element 260). The first reviewer device 108b may, in response to generation of the first reviewer digital signature 116, send, to the workflow engine 112, the first reviewer digital signature 116 (e.g., send, to the workflow engine 212, Jane's digital signature of the material data of the invoice) (element 262).

In some embodiments, different reviewers sign different portions of the material data 124 of the electronic workflow document 104. For example, each reviewer may be responsible for reviewing and signing different portions of the material data 124 (e.g., Jane may be responsible for review/approval/signing of the amount due and the due date for payment in the invoice and John may be responsible for review/approval/signing of the destination account number specified in the invoice), and the reviewers may digitally sign the respective portions that they are responsible for (e.g., Jane may digitally sign the amount due and the due date for payment in the invoice and John may digitally sign the destination account number specified in the invoice). In such an embodiment, the workflow engine 212 may, in response to receiving approval from a reviewer 106b (e.g., Jane), identify the material data 124 of the electronic workflow document 104 that the reviewer 106b is responsible for (e.g., identify the amount due and the due date for payment) (element 254), and send, to the first reviewer device 108b, a request to digitally sign the identified portion of the material data 124 (e.g., send, to Jane's device, a request for Jane to digitally sign the amount due and the due date for payment specified in the invoice she approved) (element 256). The reviewer 106b may digitally sign the identified portion of the material data 124 (e.g., as described with regard to elements 258-262).

The workflow engine 212 may, in response to receiving the first reviewer digital signature 116, determine that the first reviewer 106b has approved the electronic document (e.g., determine that Jane has approved of the invoice) (element 264), and store the first reviewer digital signature 116 in the data store 114 or other memory in association with the current version of the electronic workflow document 104 (e.g., store Jane's digital signature of the material data in a local memory of the workflow engine 212, in the data store 114 or in other memory, in association with the currently stored version of the invoice) (element 266).

The workflow engine 212 may identify whether the workflow for the electronic workflow document 104 includes any additional reviewers, and, if so, repeat the above described "review/approval" process (e.g., repeat the process of elements 224-266) for each of the identified reviewers 106b. For example, the workflow engine 212 may repeat the review (e.g., repeat the process of elements 224-266) for each of a second reviewer, a third reviewer, and so forth, in sequence. As a result, if each of the reviewers 106b approves the electronic workflow document 104, the workflow engine 212 may receive and store digital signatures 116 of the material data 124 of the electronic workflow document 104, from each of the reviewers 106b identified for the electronic workflow document 104. For example, the review process described for Jane may be repeated for John, and, if John also approves of the invoice, the workflow engine 212 may also obtain John's digital signature of the material data of the invoice and determine that John has also approved the invoice.

The workflow engine 212 may, in response to determining that all of the reviewers 106b identified in the workflow for the electronic workflow document 104 have approved the electronic workflow document 104 (e.g., including receiving digital signatures from Jane and John for the invoice), provide the electronic workflow document 104 for processing. For example, the workflow engine 212 may identify the processor 106c of the workflow defined for the electronic workflow document 104 (e.g., identify Carol as the processor of the invoice) (element 270) and send a "process request" to the "processor" device 108c associated with the processor 106c (e.g., send a process request to Jane's device) (element 272). The process request may include, for example, an e-mail message alerting the processor 106c (e.g., Carol) that the electronic workflow document 104 (e.g., the invoice) is ready for processing, and including an interactive link that is user selectable to initiate her/his processing of the electronic workflow document 104.

The processor device 108c may, in response to receiving the process request, present the process request to the processor 106c (e.g., Carol's device may display the e-mail message for Carol's review) (element 274). The processor 106c may provide, to the processor device 108c, an indication that she/he is ready to proceed with processing of the electronic workflow document 104 (e.g., Carol may select the interactive link presented in the e-mail message to indicate that she is ready to proceed with processing of the invoice) (element 276). The processor device 108c may, in response to receiving the indication that the processor 106c is ready to proceed with processing of the electronic workflow document 104, send to the workflow engine 212 a "processing request" including an indication that the processor 106b is ready to proceed with processing of the electronic workflow document 104 (e.g., Carol's device may, in response to Carol selecting the interactive link presented in the e-mail message, send, to the workflow engine 212, a corresponding processing request indicating that she is ready to proceed with processing of the invoice) (element 278).

The workflow engine 212 may, in response to receiving the process request, send, to the application 110, a "document request" including a request for the currently stored version of the electronic workflow document 104 (e.g., including a request for the currently stored version of the invoice approved by Jane and John) (element 280). The application 110 may, in response to receiving the document request, query the data store 114 for the for the currently stored version of the electronic workflow document 104 (element 282).

The data store 114 may, in response to receiving the query, send, to the application 110, a copy of the currently stored version of the electronic workflow document 104 (e.g., send, to the application 110, a copy of the currently stored version of the invoice approved by Jane and John) (element 284). The application 110 may, in response to receiving the copy of the currently stored version of the electronic workflow document 104, send, to the workflow engine 212, the copy of the currently stored version of the electronic workflow document 104 (e.g., send, to the workflow engine 212, a copy of the currently stored version of the invoice approved by Jane and John). (element 286).

The workflow engine 212 may, in response to receiving the copy of currently stored version of the electronic workflow document 104, conduct a "verification" operation that includes the following: extracting "un-verified" material data 124a from the copy of the currently stored version of the electronic workflow document 104 (e.g., identify the amount due, the due date for payment and the destination account number specified in the copy of the currently stored version of the invoice approved by Jane and John) (element 288), extracting "verified" material data 124b of the "current" digital signature 116 for the electronic workflow document 104 (e.g., identify the amount due, the due date for payment and the destination account number specified in John's digital signature of the material data of the invoice) (element 290), and comparing the "un-verified" material data 124*a* to the "verified" material data 124*b* to determine whether or not they match (element 292).

The workflow engine 212 may, in response to determining that the "un-verified" material data 124*a* and the "verified" material data 124*b* do not match, determine that the copy of the electronic workflow document 104 cannot be verified and send a corresponding notice to the relevant parties, including the initiator 106*a* or any other parties that have already reviewed/approved the electronic workflow document 104 (e.g., send, to Mike, Jane and John, a notice that the currently stored version of the invoice cannot be verified) (element 293). This may alert the parties to the fact that the electronic workflow document 104 has been altered or otherwise not approved. The initiator 106*a* can, then, identify any errors and reinitiate a workflow process for the electronic workflow document 104, if desired.

The workflow engine 212 may, in response to determining that the "un-verified" material data 124*a* and the "verified" material data 124*b* match (or "verifying" the electronic workflow document 104), send, to the processor device 108*c*, the copy of the currently stored version of the electronic workflow document 104 (e.g., send, to Carol's device, the copy of the current version of the invoice approved by Jane and John) (element 294).

The processor device 108*c* may, in response to receiving the copy of the currently stored version of the electronic workflow document 104, make the copy of the currently stored version of the electronic workflow document 104 available for processing (e.g., Carol's device may display the copy of the currently stored version of the invoice for review by Carol, along with an option to send the invoice to another entity, such as the client to which the invoice is addressed) (element 296).

Figure 3:
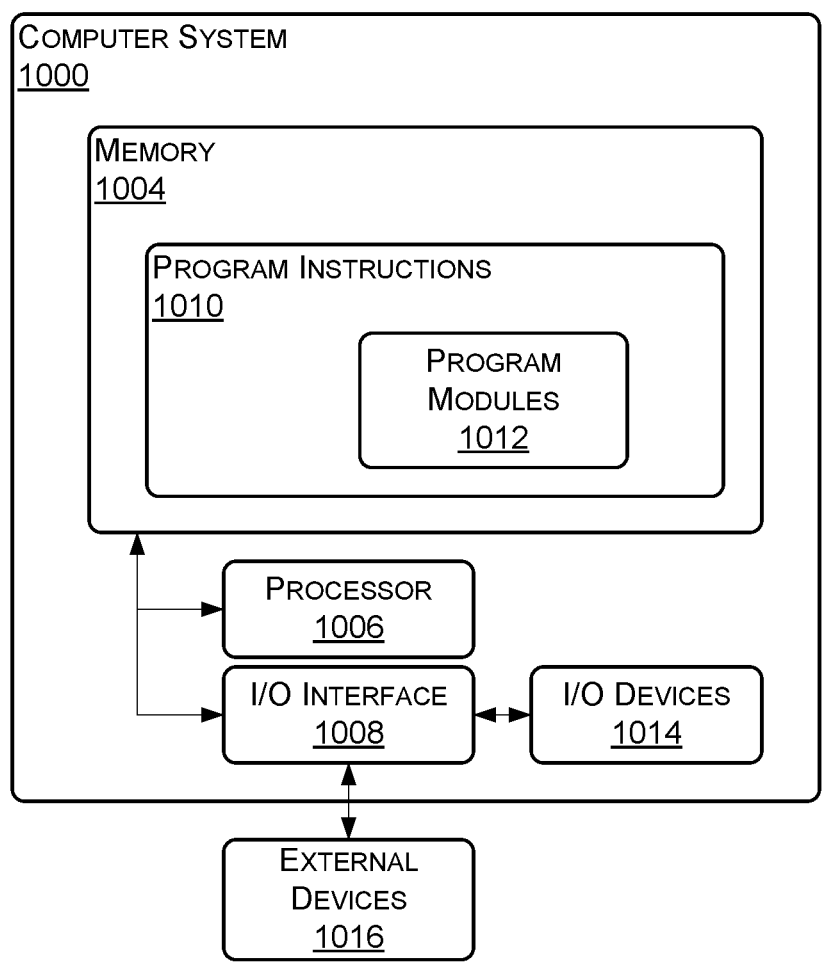
FIG. 3 is a diagram that illustrates an example computer system in accordance with one or more embodiments.

FIG. 3 is a diagram that illustrates an example computer system 1000 in accordance with one or more embodiments. The computer system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM or DVD-ROM, hard drives), or the like. The memory 1004 may include a non-transitory computer-readable storage medium storing program instructions 1010. The program instructions 1010 may include program modules 1012 that are executable by a computer processor (e.g., the processor 1006) to cause the functional operations described here, including those described with regard to the application 110, the workflow engine 112, the devices 108, or the method 200.

The processor 1006 may be one or more processors (e.g., a central processing unit (CPU)) capable of executing program instructions (e.g., the program instructions of the program module(s) 1012) to perform the arithmetical, logical, and input/output operations described here. The I/O interface 1008 may provide an interface for communication with one or more I/O devices 1014, such as a joystick, a computer mouse, a keyboard, a display screen (e.g., an electronic display for displaying a graphical user interface (GUI)), or the like. The I/O devices 1014 may be connected to the I/O interface 1008 by way of a wired connection (e.g., Industrial Ethernet) or a wireless connection (e.g., Wi-Fi). The I/O interface 1008 may provide an interface for communication with one or more external devices 1016, such as other computer devices, networks, or the like.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described. The processes and methods may be modified to facilitate variations of their implementation and use. The order of the processes and methods and the operations provided may be changed, and various elements may be added, reordered, combined, omitted, modified, etc. Portions of the processes and methods may be implemented in software, hardware, or a combination thereof. Some or all of the portions of the processes and methods may be implemented by one or more of the processors, modules, or applications described here.

As used throughout this application, the word "may" is used in a permissive sense (such as, meaning having the potential to), rather than the mandatory sense (such as, meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing based on data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method for electronic document processing, the method comprising:
    receiving, by a workflow engine from an application, a workflow request for an electronic document comprising electronic document data comprising material data provided by an initiator user;
    requesting, by the workflow engine, an initiator digital signature for the electronic document, the initiator digital signature comprising a digital signature of the material data provided by the initiator user;
    receiving, by the workflow engine, the initiator digital signature;
    identifying, by the workflow engine, a workflow defining one or more reviewer users to review the electronic document and a processor user to conduct processing of the electronic document;
    the workflow engine, for each of the one or more reviewer users:
        obtaining the electronic document and a given digital signature of the material data of the electronic document;
        conducting a verification operation comprising:
            extracting un-verified material data from the electronic document;
            extracting verified material data from the given digital signature; and
            comparing the un-verified material data to the verified material data to determine that the un-verified material data and the verified material data match;
        in response to determining that the un-verified material data and the verified material data match, providing the electronic document for review by the reviewer user;
        receiving an approval notice comprising an indication of approval of the electronic document by the reviewer user;
        in response to receiving the approval notice, requesting a reviewer digital signature for the electronic document, the reviewer digital signature comprising a digital signature of the material data provided by the reviewer user;
        receiving the reviewer digital signature; and
        in response to receiving the reviewer digital signature, determining that the reviewer user has approved the electronic document;
    determining, by the workflow engine, that all of the one or more reviewer users have approved the electronic document; and
    in response to the workflow engine determining that all of the one or more reviewer users have approved the electronic document, the workflow engine providing the electronic workflow document for processing by the processor user.

2. The method of claim 1, further comprising:
    receiving, by the application from an initiator user, the electronic document data comprising the material data;
    generating, by the application using the electronic document data comprising the material data, the electronic document; and
    storing, by the application, the electronic document in data storage.

3. The method of claim 1, wherein the workflow engine providing the electronic workflow document for processing by the processor user comprises the workflow engine:
    obtaining the electronic document and a final digital signature of the material data of the electronic document;
    conducting a verification operation comprising:
        extracting final un-verified material data from the electronic document;
        extracting final verified material data from the final digital signature; and
        comparing the final un-verified material data to the final verified material data to determine that the final un-verified material data and the final verified material data match;
    in response to determining that the final un-verified material data and the final verified material data match, providing the electronic workflow document for processing by the processor user.

4. The method of claim 1, wherein the document data comprises the material data and general data.

5. The method of claim 1, wherein the workflow engine obtaining the electronic document comprises the workflow engine obtaining the electronic document from the application.

6. The method of claim 1, wherein the given digital signature of the material data of the electronic document is generated by a user using a smart card associated with the user.

7. The method of claim 1, wherein operations performed by the application are performed by a first processor device and operations performed by the workflow engine are performed by a second processor device that is different from the first processor device.

8. The method of claim 1, wherein the application comprises a word processing application.

9. A non-transitory computer readable storage medium comprising program instructions stored thereon that are executable by a processor to cause the following operations:
    receiving, by a workflow engine from an application, a workflow request for an electronic document comprising electronic document data comprising material data provided by an initiator user;
    requesting, by the workflow engine, an initiator digital signature for the electronic document, the initiator digital signature comprising a digital signature of the material data provided by the initiator user;
    receiving, by the workflow engine, the initiator digital signature;
    identifying, by the workflow engine, a workflow defining one or more reviewer users to review the electronic document and a processor user to conduct processing of the electronic document;
    the workflow engine, for each of the one or more reviewer users:
        obtaining the electronic document and a given digital signature of the material data of the electronic document;
        conducting a verification operation comprising:
            extracting un-verified material data from the electronic document;

extracting verified material data from the given digital signature; and compraing the un-verified material data to the verified material data to determine that the un-verified material data and the verified material data match;

in response to determining that the un-verified material data and the verified material data match, providing the electronic document for review by the reviewer user;

receiving an approval notice comprising an indication of approval of the electronic document by the reviewer user;

in response to receiving the approval notice, requesting a reviewer digital signature for the electronic document, the reviewer digital signature comprising a digital signature of the material data provided by the reviewer user;

receiving the reviewer digital signature; and in response to receiving the reviewer digital signature, determining that the reviewer user has approved the electronic document;

determining, by the workflow engine, that all of the one or more reviewer users have approved the electronic document; and in response to the workflow engine determining that all of the one or more reviewer users have approved the electronic document, the workflow engine providing the electronic workflow document for processing by the processor user.

10. The medium of claim 9, the operations further comprising:

receiving, by the application from the initiator user, the electronic document data comprising the material data;

generating, by the application using the electronic document data comprising the material data, the electronic document; and storing, by the application, the electronic document in data storage.

11. The medium of claim 9, wherein the workflow engine providing the electronic workflow document for processing by the processor user comprises the workflow engine:

obtaining the electronic document and a final digital signature of the material data of the electronic document;

conducting a verification operation comprising:

extracting final un-verified material data from the electronic document;

extracting final verified material data from the final digital signature; and comparing the final un-verified material data to the final verified material data to determine that the final un-verified material data and the final verified material data match;

in response to determining that the final un-verified material data and the final verified material data match, providing the electronic workflow document for processing by the processor user.

12. The medium of claim 9, wherein the document data comprises the material data and general data.

13. The medium of claim 9, wherein the workflow engine obtaining the electronic document comprises the workflow engine obtaining the electronic document from the application.

14. The medium of claim 9, wherein the given digital signature of the material data of the electronic document is generated by a user using a smart card associated with the user.

15. The medium of claim 9, wherein operations performed by the application are performed by a first processor device and operations performed by the workflow engine are performed by a second processor device that is different from the first processor device.

16. The medium of claim 9, wherein the application comprises a word processing application.

17. A system for electronic document processing comprising: a computing processor;

a workflow engine, implemented by the computing processor, configured to:

receive, from an application, a workflow request for an electronic document comprising electronic document data comprising material data provided by an initiator user;

request an initiator digital signature for the electronic document, the initiator digital signature comprising a digital signature of the material data provided by the initiator user;

receive the initiator digital signature; identify a workflow defining one or more reviewer users to review the electronic document and a processor user to conduct processing of the electronic document;

for each of the one or more reviewer users:

obtain the electronic document and a given digital signature of the material data of the electronic document;

conduct a verification operation comprising:

extracting un-verified material data from the electronic document;

extracting verified material data from the given digital signature;

and comparing the un-verified material data to the verified material data to determine that the un-verified material data and the verified material data match;

in response to determining that the un-verified material data and the verified material data match, provide the electronic document for review by the reviewer user;

receive an approval notice comprising an indication of approval of the electronic document by the reviewer user;

in response to receiving the approval notice, request a reviewer digital signature for the electronic document, the reviewer digital signature comprising a digital signature of the material data provided by the reviewer user;

receive the reviewer digital signature; and in response to receiving the reviewer digital signature, determine that the reviewer user has approved the electronic document;

determine that all of the one or more reviewer users have approved the electronic document; and in response to the workflow engine determining that all of the one or more reviewer users have approved the electronic document, provide the electronic workflow document for processing by the processor user.

18. The system of claim 17, further comprising an application configured to:

receive, from the initiator user, the electronic document data comprising the material data;

generate, using the electronic document data comprising the material data, the electronic document; and store the electronic document in data storage.

19. The system of claim 17, wherein provide the electronic workflow document for processing by the processor user comprises:

obtain the electronic document and a final digital signature of the material data of the electronic document;

conduct a verification operation comprising:

extracting final un-verified material data from the electronic document;

extracting final verified material data from the final digital signature; and comparing the final un-verified material data to the final verified material data to determine that the final un-verified material data and the final verified material data match;

in response to determining that the final un-verified material data and the final verified material data match, provide the electronic workflow document for processing by the processor user.

20. The system of claim 17, wherein the document data comprises the material data and general data.

21. The system of claim 17, wherein obtaining the electronic document comprises the obtaining the electronic document from the application.

22. The system of claim 17, wherein the given digital signature of the material data of the electronic document is generated by a user using a smart card associated with the user.

23. The system of claim 17, wherein operations performed by the application are performed by a first processor device and operations performed by the workflow engine are performed by a second processor device that is different from the first processor device.

24. The system of claim 17, wherein the application comprises a word processing application.

* * * * *